Jan. 20, 1931.  N. H. JUDD ET AL  1,789,552
DAY AND NIGHT VIZOR
Filed April 12, 1928  2 Sheets-Sheet 1

WITNESS
Guy M. Spring

INVENTOR.
NELSON H. JUDD
GEORGE SIEGRIST
BY
Irving L. McGathran
ATTORNEYS.

Jan. 20, 1931. N. H. JUDD ET AL 1,789,552
DAY AND NIGHT VIZOR
Filed April 12, 1928    2 Sheets-Sheet 2
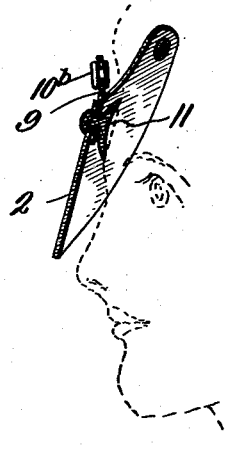
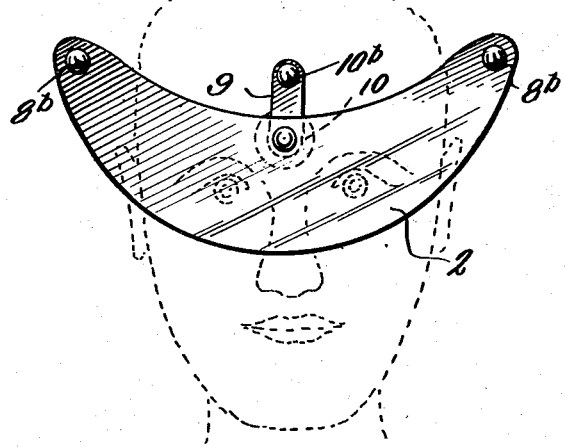
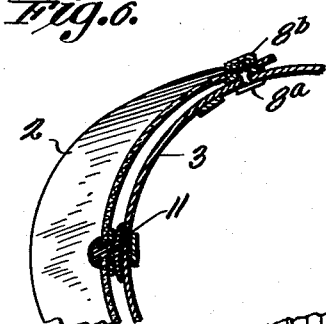
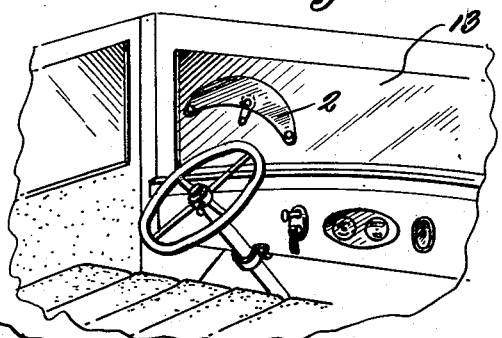
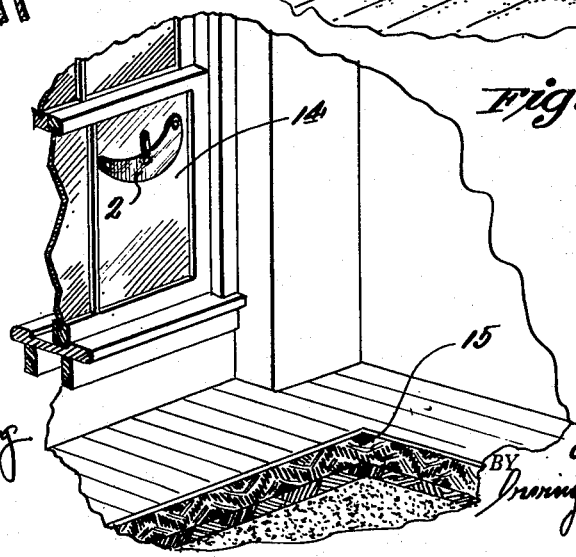
INVENTOR.
NELSON H. JUDD
GEORGE SIEGRIST
ATTORNEYS.

Patented Jan. 20, 1931

1,789,552

UNITED STATES PATENT OFFICE

NELSON H. JUDD AND GEORGE SIEGRIST, OF NORFOLK, VIRGINIA

DAY AND NIGHT VIZOR

Application filed April 12, 1928. Serial No. 269,448.

This invention relates to a glare shield, and has for one of its objects to provide a novel, simple and highly efficient article of this character which shall embody a translucent member adapted to be used by automobile drivers and worn on the head or applied to the wind shield for the purpose of protecting the eyes from road glare and from the rays of the sun, automobile head lights, street lamps and the like.

A further object of the invention is to provide a glare shield of the character stated which shall embody a cap or headgear adapted to support the translucent member in front of the eyes and adjustable to permit of its application to heads of different sizes.

A further object of the invention is to provide a glare shield of the character stated wherein the translucent member shall be adjustably connected to the cap so as to permit it to occupy a raised or lowered position with respect to the eyes, the member being adapted to be worn in raised position during the day to protect the eyes from the rays of the sun and being adapted to be worn in lowered position during the night to protect the eyes from the rays of head lights, street lamps and the like.

A further object of the invention is to provide a glare shield of the character stated wherein the translucent member shall be detachably connected to the cap and provided with a vacuum suction cup so as to permit of its being secured to the head without the aid of the cap, so as to permit of its being secured to the windshield in a position to protect the eyes from the glare of the headlights of approaching automobiles, and so as to permit of its being secured to a window of a dwelling in the path of a sunbeam and thus protect a floor covering or article of furniture in the path of the sunbeam from the deleterious action of the sunbeam.

With the foregoing and other objects in view, the nature of which will appear as the description proceeds, the invention consists in a construction, combination and arrangement of parts hereinafter fully described and claimed, and illustrated in the accompanying drawings, wherein:

Figure 1:
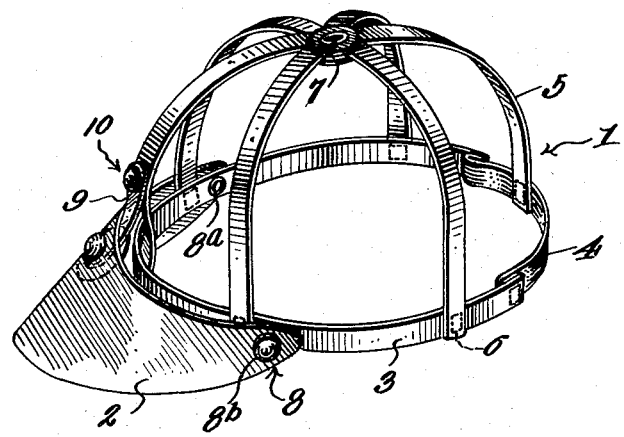
Figure 1 is a perspective view of the glare shield.
Figure 2:
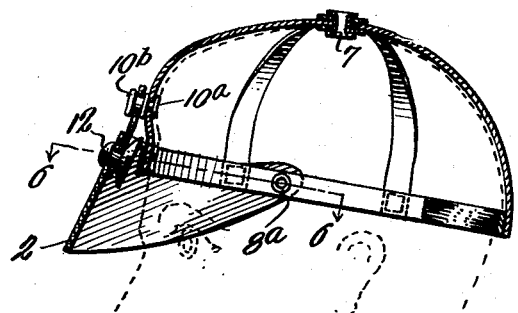
Figure 2 is a sectional view of the glare shield applied to the head with the translucent member in raised position.

Figure 4 is a sectional view illustrating the translucent member secured to the head through the medium of the vacuum suction cup, Figure 5 is a view in front elevation of the translucent member applied to the head through the medium of the suction cup, Figure 6 is a sectional view taken on the plane indicated by the line 6—6 of Figure 2, Figure 7 is a perspective view illustrating the application of the translucent member to the windshield of an automobile, and Figure 8 is a similar view illustrating the application of the translucent member to a window of a dwelling.

Referring in detail to the drawings, 1 designates the cap or headgear and 2 the translucent member or vizor of the glare shield. The cap 1 comprises a band 3 which encircles the head and is provided with an elastic insert or section to adapt the cap for application to heads of different sizes. The cap 1 also comprises straps 5 which extend over the head and are secured to the band 3, as at 6. The intersecting or overlapping end portions of the straps 5 are connected by an eyelet 7. The band 3 with the exception of its elastic portion, and the straps 5 may be made from imitation leather or any other suitable material.

The translucent member or vizor 2 is made from green celluloid. The vizor 2 is secured at its ends to the side of the band 3 by separable fasteners 8, and it is secured at its center to the foremost of the straps 5 by a tab 9 and a separable fastener 10. The fasteners 8 and 10 are of well known construction. The studs 8a of the fasteners 8 are secured to the band 3, and the sockets 8b of the fasteners are secured to the vizor 2. The stud 10a of the fastener 10 is secured to the front strap 5, and the socket 10b of this fastener is secured to the tab 9. A vacuum suction cup 11 is secured to the inner side of the vizor 2 at a point centrally between the ends and adjacent the upper edge of the vizor. The vacuum cup 11 is secured in place through the medium of a stud 12 which is also employed to secure the tab 9 to the vizor 2.

Figure 3:
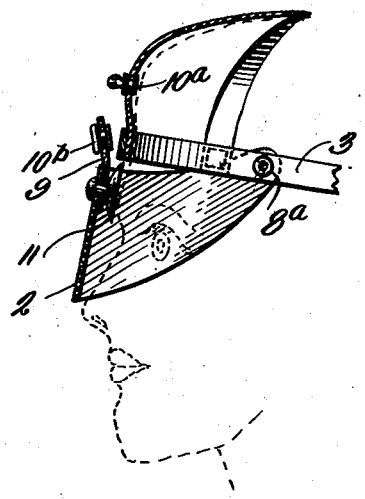
Figure 3 is a similar view with the translucent member in lowered position.

The vizor 2 is adjustably connected to the cap 1 and due thereto it may be worn in the raised position in which it is shown in Figure 2 or in the lowered position in which it is shown in Figure 3. It is worn in raised position during the day to protect the eyes from the rays of the sun and it is worn in lowered position during the night to protect the eyes from the rays of headlights, street lamps and the like. It may also be worn in lowered position during the day to protect the eyes from road glare. When in raised position the vizor 2 occupies a downwardly and forwardly inclined position over the eyes, and when in lowered position, the vizor occupies a substantially vertical position in front of the eyes. The fasteners 8, the tab 9 and the fastener 10 support the vizor 2 in raised position. When it is desired to adjust the vizor 2 into lowered position the tab 9 is disengaged from the cap 1, and thereafter the vizor is rocked into lowered position on the fasteners 8 as pivots.

The vizor 2 is also detachably connected to the cap 1. When it is detached from the cap 1, the vizor 2 may be attached to the forehead through the medium of the vacuum suction cup 11, as shown in Figures 4 and 5, or to the windshield 13, of an automobile, as shown in Figure 7, or to the window 14 of a dwelling as shown in Figure 8. When attached to the windshield 13, the vizor 2 will protect the eyes of the driver of the automobile from road glare and from the glare of headlights, street lamps, sun and the like. When applied to the window 14 of a dwelling, the vizor 2 is arranged across that portion of the window through which a beam of sunlight is passing so as to prevent the beam of light from injuring the rug 15 in the room of which the window forms a part.

From the foregoing description, taken in connection with the drawings, it will be apparent that the translucent member 2 may be readily applied to the head through the medium of the cap 1 or vacuum suction cup 11, that it may be readily applied to the windshield of an automobile or a window of a room through the medium of the vacuum suction cup, that it may be, when applied to the head through the medium of the cap, readily adjusted into its raised or lowered position, and that it will when in any of its various applications or positions efficiently perform the function for which it was designed.

While we have described the principle of operation of the invention, together with the structure which we now consider to be the best embodiment thereof, we desire to have it understood that the structure shown is merely illustrative, and that such changes may be made when desired as are within the scope of the invention as claimed.

What we claim is.

1. An eye shade and glare shield device comprising a head band, means for supporting the band on the head, a translucent vizor normally projecting from the head band, companion separable fastener members connecting the ends of the vizor with the sides of the head band, the vizor being movable on the fasteners to different positions, a tab extending upwardly from the vizor, and companion portions of a separable fastener connecting the tab with the band support for holding the vizor against swinging movement on the first mentioned separable fasteners and in one adjusted position.

2. An eye shade and glare shield device comprising a head band, means for supporting the band on the head, a transparent vizor normally projecting from the head band, companion separable fasteners for connecting the ends of the vizor to the sides of the head band, the vizor being movable on the separable fasteners to different positions, a tab extending upwardly from the vizor, companion separable fastener members for detachably connecting the tab with the band support for holding the vizor against swinging movement on the first mentioned separable fasteners and in one adjusted position, the vizor and tab having registering openings, and a forehead engaging vacuum suction cup having a button extending through the said registering openings.

3. An eye shade and glare shield comprising a head encircling band, a translucent visor normally projecting forwardly from the band, means pivotally connecting the ends of the vizor to the sides of the band, whereby the same can be swung to different positions, means releasably supporting the vizor against pivotal movement and in one adjusted position, and a forehead engaging vacuum suction cup connected with the vizor.

4. An eye shade and glare shield device comprising a head engaging support, a translucent member constituting the sole vizor for the device and normally projecting forwardly from the support, means pivotally connecting the ends of the vizor to the sides of the support, and means detachably connecting the center of the vizor to the front of the support, said last means embodying a tab connected to the vizor and a fastener detachably connecting the tab to the support.

5. An eye shade and glare shield device comprising a head band, a translucent member constituting the sole vizor for the device, means detachably and pivotally connecting the vizor to the head band, and a forehead engaging vacuum suction cup connected to the central portion of the vizor.

In testimony whereof we affix our signatures.

NELSON H. JUDD.
GEORGE SIEGRIST.